United States Patent
Bach Castillo

(10) Patent No.: US 9,872,805 B2
(45) Date of Patent: Jan. 23, 2018

(54) AUXILIARY MOBILITY SYSTEM FOR A WHEELCHAIR

(71) Applicant: Batec Mobility, S.L., Barcelona (ES)

(72) Inventor: Pablo Alejandro Bach Castillo, Barcelona (ES)

(73) Assignee: Batec Mobility, S.L., Barcelona (ES)

( * ) Notice: Subject to any disclaimer, the term of this patent is extended or adjusted under 35 U.S.C. 154(b) by 0 days.

(21) Appl. No.: 14/903,060

(22) PCT Filed: Jul. 8, 2014

(86) PCT No.: PCT/ES2014/070555
§ 371 (c)(1),
(2) Date: Jan. 6, 2016

(87) PCT Pub. No.: WO2015/004298
PCT Pub. Date: Jan. 15, 2015

(65) Prior Publication Data
US 2016/0317368 A1    Nov. 3, 2016

(30) Foreign Application Priority Data
Jul. 8, 2013    (ES) .................................. 201331024

(51) Int. Cl.
*A61G 5/10*    (2006.01)
*B62K 3/16*    (2006.01)
(Continued)

(52) U.S. Cl.
CPC ............... *A61G 5/10* (2013.01); *A61G 5/021* (2013.01); *A61G 5/027* (2013.01); *A61G 5/042* (2013.01);
(Continued)

(58) Field of Classification Search
CPC ...... A61G 5/1005; A61G 5/027; A61G 5/021; A61G 5/042; A61G 5/047; A61G 5/025
See application file for complete search history.

(56) References Cited

U.S. PATENT DOCUMENTS

| 2,649,309 A | 8/1953 | Deissner |
| 4,316,616 A * | 2/1982 | Boivin .................. A61G 5/023 280/250 |

(Continued)

FOREIGN PATENT DOCUMENTS

| DE | 202006009717 | 9/2006 |
| EP | 0629390 | 12/1994 |

(Continued)

OTHER PUBLICATIONS

International Search Report and the Written Opinion Dated Sep. 22, 2014 From the Oficina Espanole de Patentes y Marcas Re. Application No. PCT/ES2014/070555 and Its Translation of Search Report in English.

*Primary Examiner* — Kevin Hurley

(57) ABSTRACT

The invention relates to an auxiliary mobility system for a wheelchair, comprising a frame, at least one wheel-bearing part and at least one steering element or handlebar, said bearing part being connected to the frame such that it can rotate concentrically about its axial axis under the action of the steering element. The system also comprises means for rotating the bearing part concentrically in relation to an axis substantially parallel to the rotation axis of the wheel.

15 Claims, 1 Drawing Sheet

(51) Int. Cl.
*B62K 5/025* (2013.01)
*A61G 5/04* (2013.01)
*A61G 5/02* (2006.01)

(52) U.S. Cl.
CPC ........... *A61G 5/047* (2013.01); *A61G 5/1005* (2013.01); *A61G 5/1051* (2016.11); *B62K 3/16* (2013.01); *B62K 5/025* (2013.01)

(56) References Cited

U.S. PATENT DOCUMENTS

| | | | | |
|---|---|---|---|---|
| 4,471,972 | A | | 9/1984 | Young |
| 4,600,207 | A | * | 7/1986 | Zosi ....................... B62K 21/00 280/276 |
| 4,811,964 | A | | 3/1989 | Horn |
| 5,066,032 | A | * | 11/1991 | Van Vooren ........... A61G 5/023 280/304.1 |
| 5,207,286 | A | * | 5/1993 | McKelvey ............. A61G 5/047 180/13 |
| 5,241,881 | A | * | 9/1993 | Chen ....................... B62K 21/14 280/276 |
| 5,272,936 | A | * | 12/1993 | Nagano .................. B62K 21/06 280/276 |
| 5,312,127 | A | * | 5/1994 | Oxford .................. A61G 5/023 280/250.1 |
| 5,501,480 | A | * | 3/1996 | Ordelman .............. A61G 5/023 180/13 |
| 5,816,598 | A | * | 10/1998 | Dodakian ................ B62M 1/12 280/233 |
| 5,887,490 | A | * | 3/1999 | Dittmar .................. B62K 21/16 74/551.3 |
| 6,669,222 | B1 | * | 12/2003 | Barrett ................... A61G 5/023 280/250 |
| 6,973,853 | B2 | * | 12/2005 | Chang ...................... B62D 1/12 280/278 |
| 7,150,076 | B2 | * | 12/2006 | Chang .................... B62K 21/18 16/421 |
| 7,216,728 | B2 | * | 5/2007 | Huang ................... A61G 5/047 180/13 |
| 7,637,521 | B2 | * | 12/2009 | Grant ..................... B62K 13/00 280/276 |
| 7,721,835 | B2 | * | 5/2010 | Radtke ..................... B62M 6/40 180/12 |
| 7,735,847 | B2 | * | 6/2010 | Dougherty ............. A61G 5/003 280/304.1 |
| 9,056,035 | B2 | * | 6/2015 | Ju ........................... A61G 5/027 |
| 9,326,901 | B2 | * | 5/2016 | Conte ..................... A61G 5/047 |
| 2005/0206115 | A1 | * | 9/2005 | Lee ......................... A61G 5/023 280/250.1 |
| 2006/0000664 | A1 | | 1/2006 | Huan et al. |
| 2006/0060405 | A1 | * | 3/2006 | Pender ................... B62K 19/32 180/219 |
| 2006/0267309 | A1 | * | 11/2006 | Markovic .............. A61G 5/023 280/246 |
| 2007/0096427 | A1 | | 5/2007 | Knaub |
| 2008/0128227 | A1 | * | 6/2008 | Yeager ................. A61G 5/1018 188/2 F |
| 2008/0157501 | A1 | * | 7/2008 | Moller ..................... A61G 5/08 280/250.1 |
| 2011/0101642 | A1 | | 5/2011 | Chiu |
| 2015/0351979 | A1 | * | 12/2015 | Conte .................... A61G 5/047 180/13 |

FOREIGN PATENT DOCUMENTS

| | | |
|---|---|---|
| GB | 2124985 | 2/1984 |
| GB | 2372022 | 8/2002 |
| WO | WO 2009/002543 | 12/2008 |
| WO | WO 2015/004298 | 1/2015 |

\* cited by examiner

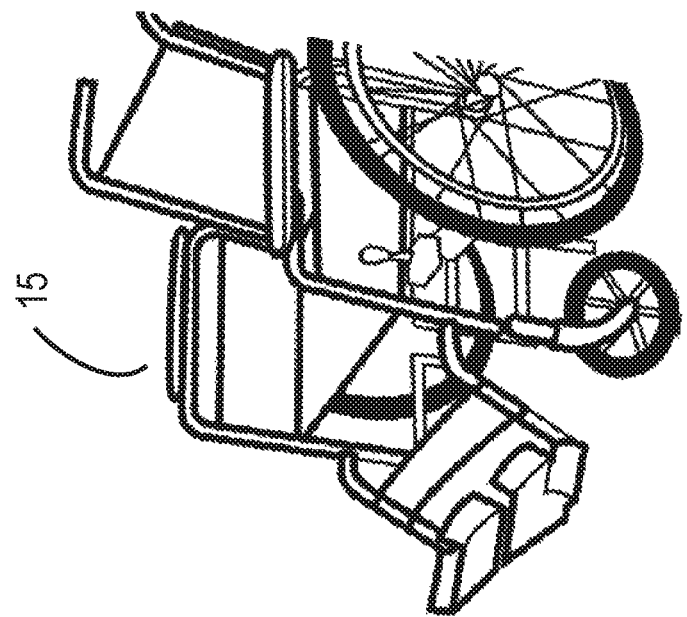
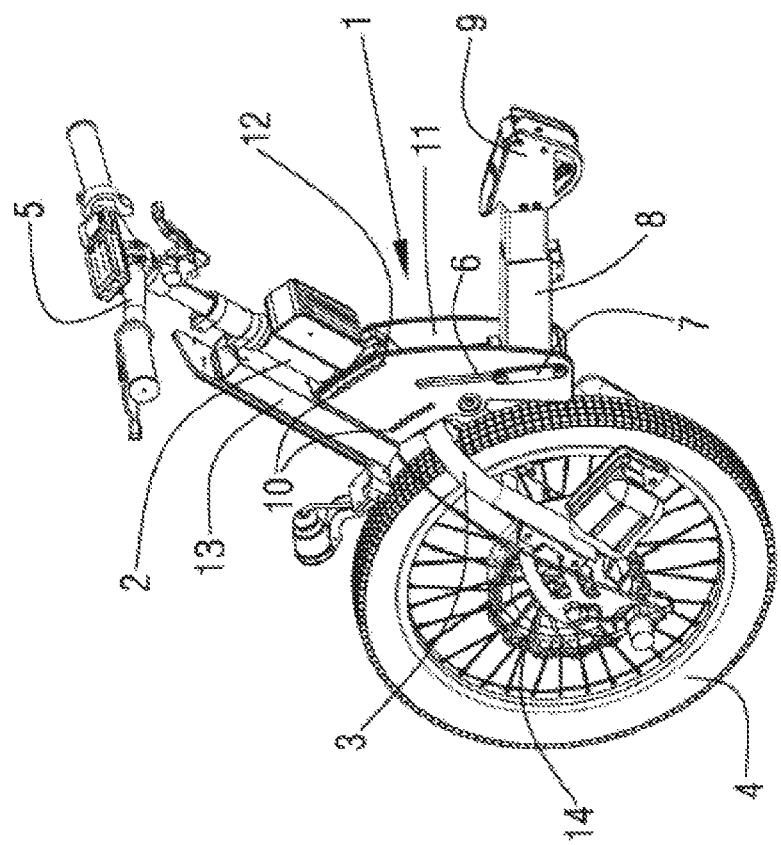

AUXILIARY MOBILITY SYSTEM FOR A WHEELCHAIR

RELATED APPLICATIONS

This application is a National Phase of PCT Patent Application No. PCT/ES2014/070555 having International filing date of Jul. 8, 2014, which claims the benefit of priority of Spanish Patent Application No. P201331024 filed on Jul. 8, 2013. The contents of the above applications are all incorporated by reference as if fully set forth herein in their entirety.

FIELD AND BACKGROUND OF THE INVENTION

The object of the present Patent of Invention application is to register an auxiliary mobility system for a wheelchair, which includes significant innovations and advantages with respect to the techniques used to date.

More specifically, the invention proposes the development of an auxiliary mobility system for a wheelchair which, due to its particular design, enables the reversible conversion of a wheelchair of the conventionally known type into a chair in the manner of a tricycle in a simple and practical manner.

Wheelchairs used for use by disabled persons are known in the current state of the art.

The wheelchairs known and used to date have effective operation and adaptation in places with small and eminently flat dimensions, and for travelling short distances. However, in the case of longer distances and particularly of more irregular floors, their features are more limited.

A possible solution for this reduction in features is the conversion of the chair with two wheels into a chair with three wheels in the manner of a tricycle, with an additional central and front wheel, which is also used as a governor to control the direction of movement of the chair.

This new chair design offers enhanced features in its operation, both in terms of stability particularly on irregular floors and in terms of its capacity to be driven and controlled by the user.

The solutions known to date in the state of the art to perform said conversion involve the inclusion of a sleeve mechanism and do not allow correct adaptation of the resulting geometry of the chair to the different ergonomic needs of different users; in addition, its installation and fit is highly complex and cumbersome for the user, and also requires the intervention of an installer for such purpose.

The regulation of some of the characteristic parameters in the resulting geometry involves the unwanted alteration of others, even preventing final coupling to the wheelchair.

The present invention contributes to solving this problem, as it enables the conversion of a traditional wheelchair into a chair in the manner of a tricycle, with the advantages inherent to its features, in a simple and practical way for the user.

SUMMARY OF THE INVENTION

The present invention has been developed for the purpose of providing an auxiliary mobility system for a wheelchair, which comprises a frame, at least one wheel-bearing part and at least one steering element or handlebar, wherein the bearing part is connected to the frame such that it rotates concentrically about its own axial axis under the action of the steering element and is characterised essentially in that it comprises means for rotating the bearing part concentrically in relation to an axis substantially parallel to the rotation axis of the wheel.

Preferably, the auxiliary mobility system for a wheelchair comprises horizontal means for regulating the horizontal distance of the frame in relation to the chair in the longitudinal direction of movement of the chair itself.

Additionally, the auxiliary mobility system for a wheelchair comprises vertical means for regulating the vertical distance of the frame in relation to the rolling floor of the chair.

Furthermore, in the auxiliary mobility system for a wheelchair, the horizontal regulation means are embodied by a telescopic system, wherein one end thereof is connected to the frame and the other end is connected to the chair.

Alternatively, in the auxiliary mobility system for a wheelchair, the vertical regulation means are embodied by an implement movable by guides made in the frame and having tightening means for fixing the implement in its travel along the guides.

In addition, in the auxiliary mobility system for a wheelchair, the tightening means are embodied by screwing elements.

Likewise, in the auxiliary mobility system for a wheelchair, the rotation means of the bearing part are embodied by at least one recess in the manner of a hole positioned on the frame, and at least one protrusion connected to the bearing part and adapted to fit into said recess, such that the bearing part can pivot in relation to the frame itself.

Preferably, in the auxiliary mobility system for a wheelchair, the steering element or handlebar is movable in the axial direction of the bearing part.

Additionally, in the auxiliary mobility system for a wheelchair, the bearing part comprises a fork.

Furthermore, in the auxiliary mobility system for a wheelchair, the concentric axis of the rotation means and the rotation axis of the wheel are coincident.

Alternatively, the auxiliary mobility system for a wheelchair includes driving means.

In addition, in the auxiliary mobility system for a wheelchair, the driving means are embodied by a rack-and-pinion system which is manually actuated and exerts a traction force on the wheel.

Likewise, in the auxiliary mobility system for a wheelchair, the driving means are embodied by a motor connected to the wheel.

In the same manner, the auxiliary mobility system for a wheelchair comprises a battery system enabled for supplying power to the motor.

Likewise, the auxiliary mobility system for a wheelchair comprises wheel braking means.

Thanks to the present invention, the simple, practical and effective conversion of a traditional wheelchair into a tricycle is achieved, with the associated added advantages and features.

In addition, the user does not require the presence of an installer for such purpose, to carry out the regulation of the different characteristic parameters in the resulting geometry.

Other characteristics and advantages of the auxiliary mobility system for a wheelchair will be evident in the description of a preferred but not-limiting embodiment, illustrated by way of non-limiting example in the accompanying drawings, wherein:

BRIEF DESCRIPTION OF THE DRAWINGS

FIG. 1 shows a schematic representation of a preferred embodiment of the auxiliary mobility system for a wheelchair of the invention.

DESCRIPTION OF SPECIFIC EMBODIMENTS OF THE INVENTION

As shown in FIG. 1, the auxiliary mobility system for a wheelchair (15), which comprises a frame (1), one wheel-bearing part (4) and one steering element (5) or handlebar, said bearing part being connected to the frame (1) such that it can rotate concentrically about its own axial axis under the action of the steering element (5) comprises means for rotating the bearing part concentrically in relation to an axis substantially parallel to the rotation axis of the wheel (4).

In this preferred embodiment schematically represented in FIG. 1, the frame (1) has two parallel plates (11), between which a sleeve (2) is positioned and secured.

The bearing part is embodied by a fork (3), which is housed in turn inside the sleeve (2) and concentrically therewith. The fork (3) rotates inside the sleeve (2), concentrically about its axial axis.

The fork (3) bears a front wheel (4) at its forked end. At its other opposite end it has in turn a steering element (5) or handlebar, wherewith it can be rotated and therefore rotate the wheel (4), in a manner similar to a bicycle or motorcycle.

The frame (1) comprises rotation means which enable the sleeve (2) inserted between the plates (11) of the frame (1) to pivot concentrically in relation to an axis substantially parallel to the rotation axis of the wheel (4).

In this preferred embodiment, the rotation means are embodied by openings (10) in the manner of holes positioned on the plates (11) parallel and adjacent to the sleeve (2), which is positioned between said plates (11), and protrusions (12) in the sleeve (2), adapted to fit in such openings (10), in the manner of a tongue-and-groove joint.

For a person skilled in the art, other possible embodiments will be possible such as, for example, that the openings (10) are connected to the sleeve (2) and the protrusions (12) are on the plates (11).

According to the fit of the protrusions (12) of the sleeve (2) in the openings (10) of the plates (11), the sleeve (2) and therefore the fork (3) will have a different degree of rotation within their insertion between the plates (11) of the frame (1).

In this preferred embodiment, the concentric axis of the rotation means and the rotation axis of the wheel (4) are coincident.

The frame (1) also comprises vertical regulation means. Vertical is understood to be a direction substantially perpendicular to the rolling floor of the chair. Such vertical regulation means enable the regulation of the vertical distance of the frame (1) in relation to the rolling floor of the chair.

In this embodiment, the vertical regulation means are embodied by guides (6) enabled in the two parallel plates (11) of the frame (1) and an implement (7) enabled for travelling along the guides (6), functioning in a manner similar to a slide system.

Such implement (7) is movable through the inside of the guides (6) and has tightening means in order to be fixed and immobilised in a certain position on the guides (6).

In this preferred embodiment, such tightening means are embodied by screwing elements which enable the fixation and immobilisation of the implement (7) in a certain position in its travel along the guides (6).

The frame (1) also comprises horizontal regulation means. Horizontal is understood to be a direction substantially parallel to the rolling floor of the chair. Such horizontal regulation means enable the regulation of the horizontal distance of the frame (1) in relation to the chair and in the longitudinal direction of the movement of the chair.

In this preferred embodiment, the horizontal regulation means are embodied by a telescopic system constituted by a telescopic rod (8) of variable and fixable length. Such telescopic rod (8) is in turn joined at one of its ends to the implement (7).

At the other end of the telescopic rod (8) it is connected to the chair. In this preferred embodiment, such connection is established by a manual and reversible coupling system (9) to the chair. Such manual coupling system is enabled for the manual and reversible fixation thereof to the chair and not is not an object of the present invention and does not appear represented in detail in FIG. 1.

In its use, and in this preferred embodiment, the auxiliary mobility system for a wheelchair of the invention is coupled to the chair by means of the manual coupling system (9).

Immediately thereafter, through the regulation of the variable length of the telescopic rod (8), the extension in the horizontal axis of the positioning of the frame (1) in relation to the chair is regulated.

Next, through the travel and subsequent fixation of the implement (7) on the guides (6), the extension is regulated in the vertical axis of the positioning of the frame (1) in relation to the chair.

Next, through the fitting of the protrusions (12) of the sleeve (2) in the different openings (10) of the plates (11), the desired degree of inclination is conferred to the sleeve (2) and therefore to the fork (3) in relation to the horizontal or vertical axis.

The order of the described operations is not imperative and is selected by the user and/or installer.

The steering element (5) or handlebar can also be regulated in its movement in the axial direction of the sleeve (2), in a similar manner to that of a bicycle of those commonly known in the state of the art.

The auxiliary mobility system for a wheelchair of the invention may also include movement means that provide the resulting chair-tricycle with the possibility of aiding its movement.

The movement means may be embodied by a rack-and-pinion system manually actuated by the user that transmits traction to the wheel (4) or by a motor motively connected to the wheel (4).

In this preferred embodiment, the invention also comprises a battery system (13) enabled to supply power to the motor.

Additionally, it also comprises wheel (4) braking means embodied by a disc braking system (14).

All the different features described enable the adaptation and conversion of a wheelchair in the manner of a tricycle, with an added central and front wheel, which is also used as a governor of the direction of the movement of the chair and even as a traction element.

In addition, the proposed invention is very effective in the regulation and adaptation of the resulting geometry in the chair to the user's different ergonomic needs, all in a simple, practical and quick manner for the user, without requiring the intervention of an installer for such purpose.

The details, shapes, dimensions and other accessory elements, as well as the materials used in the manufacture of the auxiliary mobility system for a wheelchair of the invention may be conveniently replaced by other, technically equivalent ones that do not detract from the essence of the invention or from the scope defined by the claims included below.

What is claimed is:

1. An auxiliary mobility system adapted to be mechanically connected to a wheelchair, said auxiliary mobility system comprises:
   a frame,
   a fork adapted to bear a wheel, and
   at least one steering element or handlebar,
   wherein said fork rotates concentrically in a sleeve about an axial axis under the action of the steering element or the handlebar;
   wherein said frame comprises plates for securing said sleeve, said plates having elongated guiding slots for vertically regulating the frame in relation to a proximal end of a rod having a coupling system at its distal end adapted to be coupled to the wheelchair;
   wherein said sleeve is adapted to pivot concentrically between said plates in relation to an axis substantially parallel to a rotation axis of the wheel; and
   wherein the rod having an implement at its proximal end movable along the elongated guiding slots and adapted to be fixed in any position along the elongated guiding slots.

2. The auxiliary mobility system according to claim 1, further comprising a telescopic rod for horizontally regulating a horizontal distance between the frame and a coupling system adapted to be coupled to the wheelchair in the longitudinal direction of the movement of the wheelchair.

3. The auxiliary mobility system according to claim 1 wherein the implement is fixed using screwing elements.

4. The auxiliary mobility system according to claim 1 wherein the sleeve comprises at least one protrusion adapted to fit in at least one of a plurality of openings in the plates.

5. The auxiliary mobility system according to claim 1 wherein the steering element or handlebar can move in the axial direction of the fork.

6. The auxiliary mobility system according to claim 1 wherein a concentric axis around which said sleeve is adapted to pivot and the rotation axis of the wheel are coincident.

7. The auxiliary mobility system according to claim 1, further comprising a motor.

8. The auxiliary mobility system according to claim 1, further comprising a rack-and-pinion system which is manually actuated and exerts a traction force on the wheels.

9. The auxiliary mobility system according to claim 7, wherein the motor is connected to the wheel.

10. The auxiliary mobility system according to claim 9, further comprising a battery system enabled to supply power to the motor.

11. The auxiliary mobility system according to claim 1, further comprising a disc braking system.

12. The auxiliary mobility system of claim 1, wherein said fork is bearing a wheel and said coupling system is coupled to said wheelchair.

13. The auxiliary mobility system of claim 1, wherein said sleeve moves between said plates in a pivoting direction in relation to said axis substantially parallel to said rotation axis of the wheel.

14. An auxiliary mobility system, comprising:
   a frame;
   a sleeve positioned and secured on the frame; and
   a fork for bearing a wheel and attached to a steering element or handlebar;
   wherein the fork being housed inside the sleeve such that the fork rotates about a longitudinal axis of the fork;
   wherein the sleeve is adapted to pivot with respect to the frame around a pivoting axis parallel to a rotation axis of said wheel, such that a degree of inclination is conferred to the sleeve and therefore to the fork in relation to a horizontal axis, said pivoting axis is located between a lower end of the sleeve and the rotation axis of the wheel.

15. An auxiliary mobility system, comprising:
   a frame having two parallel plates between which a sleeve is positioned and secured; and
   a fork for bearing a wheel and attached to a steering element or handlebar;
   wherein the fork is housed inside the sleeve such that the fork rotates about a longitudinal axis of the fork;
   wherein the sleeve is adapted to pivot with respect to the frame, such that a degree of inclination is conferred to the sleeve and therefore to the fork in relation to a horizontal axis;
   wherein the sleeve comprises at least one protrusion adapted to fit in at least one of a plurality of openings in the two parallel plates; and
   wherein said degree of inclination is determined according to a fit of said at least one protrusion and said at least one of said plurality of openings.

* * * * *